Figure 1:
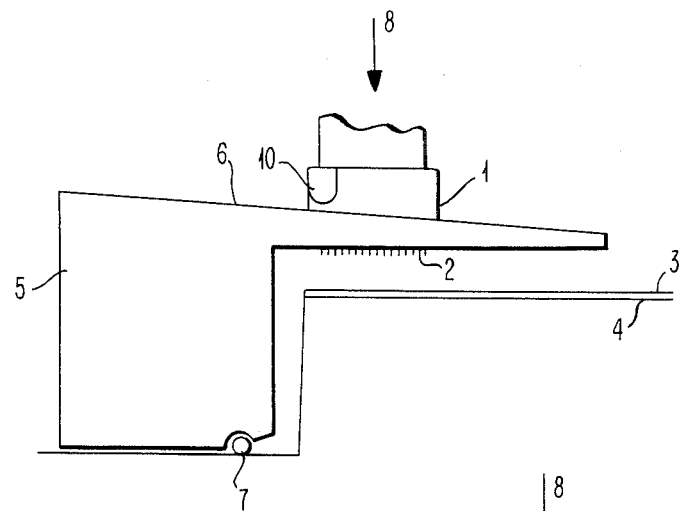

United States Patent [19]

Goldrian et al.

[11] Patent Number: 4,553,862
[45] Date of Patent: Nov. 19, 1985

[54] APPARATUS FOR THE BOUNCE-FREE LANDING OF A PRINT HEAD

[75] Inventors: Gottfried Goldrian, Boeblingen; Manfred Nitschke, Herrenberg; Volker Rudolph, Aidlingen; Manfred Wohnsdorf, Boeblingen, all of Fed. Rep. of Germany

[73] Assignee: International Business Machines Corporation, Armonk, N.Y.

[21] Appl. No.: 588,467

[22] Filed: Mar. 12, 1984

[30] Foreign Application Priority Data

Apr. 4, 1983 [EP] European Pat. Off. ........ 83103292.5

[51] Int. Cl.[4] .............................................. B41J 3/04
[52] U.S. Cl. .................................. 400/121; 400/119; 346/76 R

[58] Field of Search .................. 400/55, 59, 118, 119, 400/120, 56, 57, 58, 121, 124; 346/76 R, 76 PH, 139 R, 139 A, 139 B, 139 C, 139 D, 153.1

[56] References Cited

U.S. PATENT DOCUMENTS 3,787,886  1/1974  McCrady ............................ 400/120
4,024,940  5/1977  Hendrischk et al. ................. 400/59

Primary Examiner—Paul T. Sewell
Assistant Examiner—David A. Wiecking
Attorney, Agent, or Firm—E. Ronald Coffman

[57] ABSTRACT

A yieldably supported ramp controls the lowering of a print head onto a record carrier. An elastically deformable element having non-linear deformation characteristics is preferred to define the desired force displacement characteristics.

4 Claims, 8 Drawing Figures

U.S. Patent  Nov. 19, 1985  Sheet 1 of 4  4,553,862

APPARATUS FOR THE BOUNCE-FREE LANDING OF A PRINT HEAD

FIELD OF THE INVENTION

This invention relates to the field of printers wherein a print head is moved into and out of position adjacent a record carrier.

BACKGROUND OF THE INVENTION

A print head may be lifted off and caused to land on a record carrier by respectively using, for example, a spring and an electromagnet. It is also possible to keep the print head lifted off by means of an electromagnet and to cause it to land on the record carrier with the aid of a spring assembly after the electromagnet has been de-energized. U.S. patent application Ser. No. 496,760, filed May 20, 1983 and issued Mar. 5, 1985 as U.S. Pat. No. 4,502,797, discloses an arrangement employing two differently biased springs or spring assemblies, wherein the weaker spring assembly lifts off the print head, while the stronger spring assembly is locked. Upon release of the locked assembly by means of a magnet, a soft landing of the print head is obtained by the stronger spring rendering the weaker one ineffective. Generally speaking, in printers with one print head, the head is kept and guided in a defined print position and lifted off during its return motion or upon completion of the print process. When the print head subsequently touches down for a further print operation, kinetic energy is released. If the record carrier is flexibly supported on a resilient platen, the print head will penetrate the record carrier more deeply or, in the absence of such a platen, it will tend to bounce. This bouncing is difficult to eliminate even by complicated damping systems, because of the deceleration time required and the tendency of the damping system to oscillate.

DISCLOSURE OF THE INVENTION

While a ramp may be employed to guide and control the lowering of a print head onto a record carrier, such an arrangement is limited to low speed operation. At higher speeds, the head will bounce. A defined print start and a good print quality are obtained only if oscillations are avoided when the print head is lowered onto the ramp.

Therefore, it is the object of the invention to design an apparatus of the above-described kind, such that the print head can be lowered without bounce onto a ramp and the record carrier. To achieve this result, this invention provides the ramp by means of a lever which can be tilted about an axis. The ramp slopes down in the direction of lateral movement of the print head. The print head has a sliding shoe that engages the ramp. An elastically deformable element is clamped between the lever and a fixed support to control yielding of the lever arm in response to force from the print head.

Figure 2:
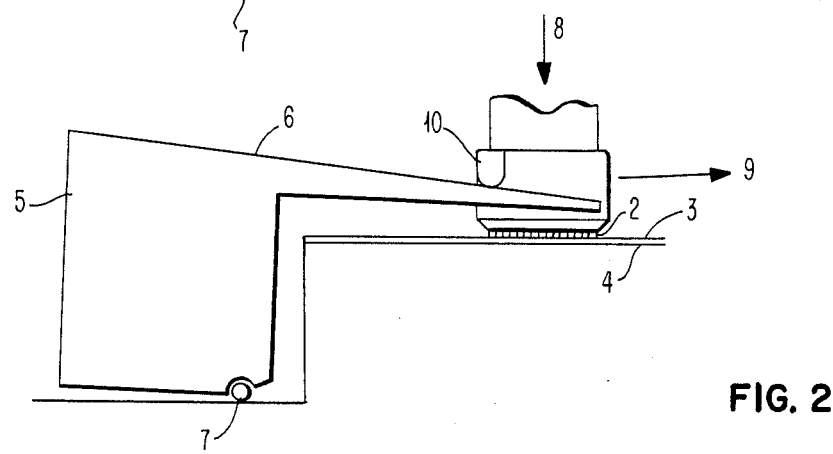
Figure 3:
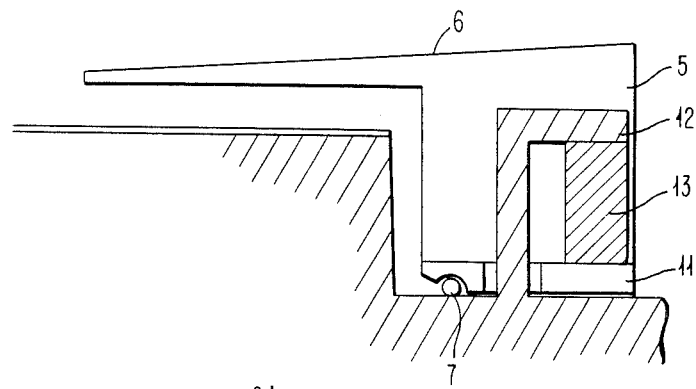
Figure 4:
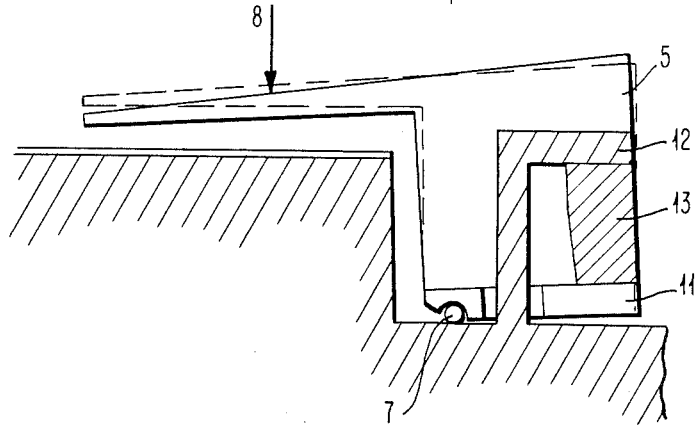
Figure 5:
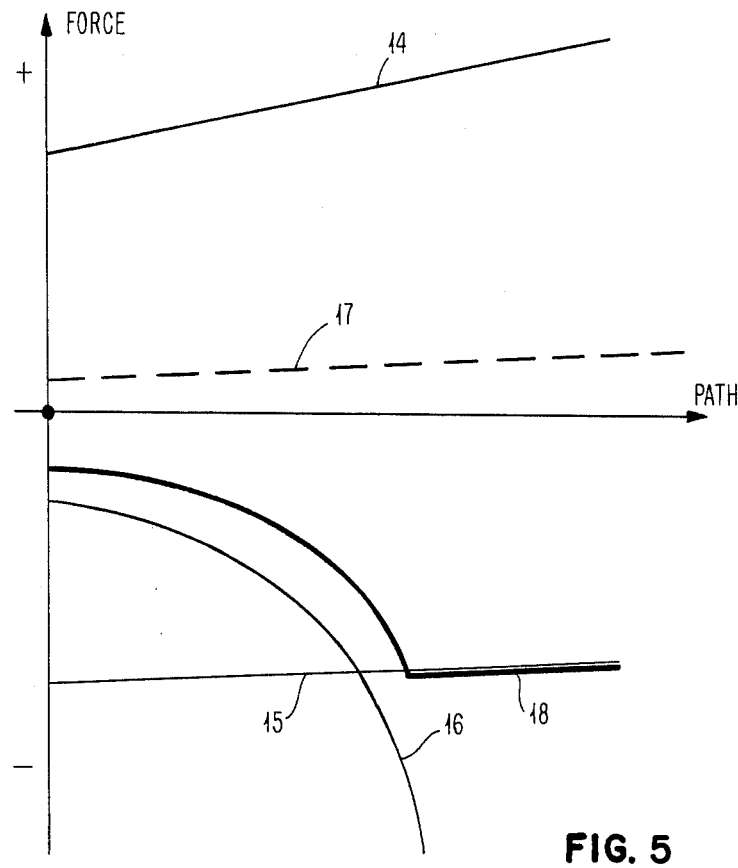
Figure 6:
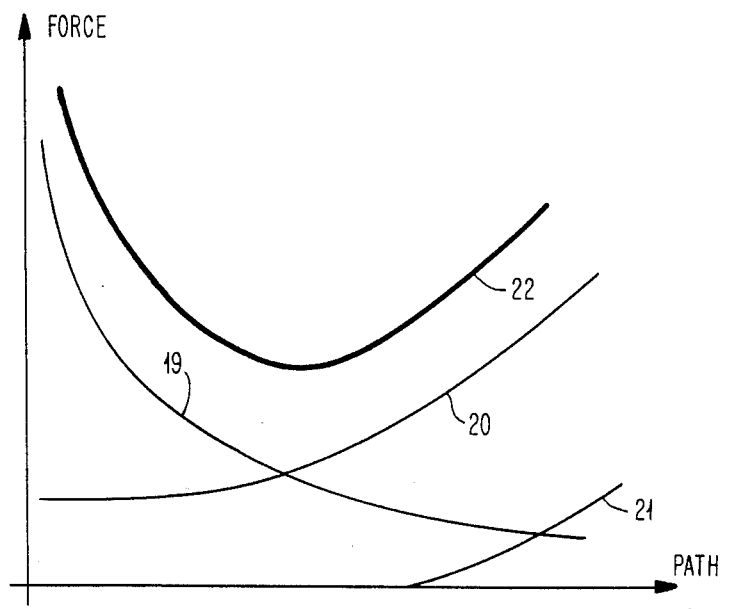
Figure 7:
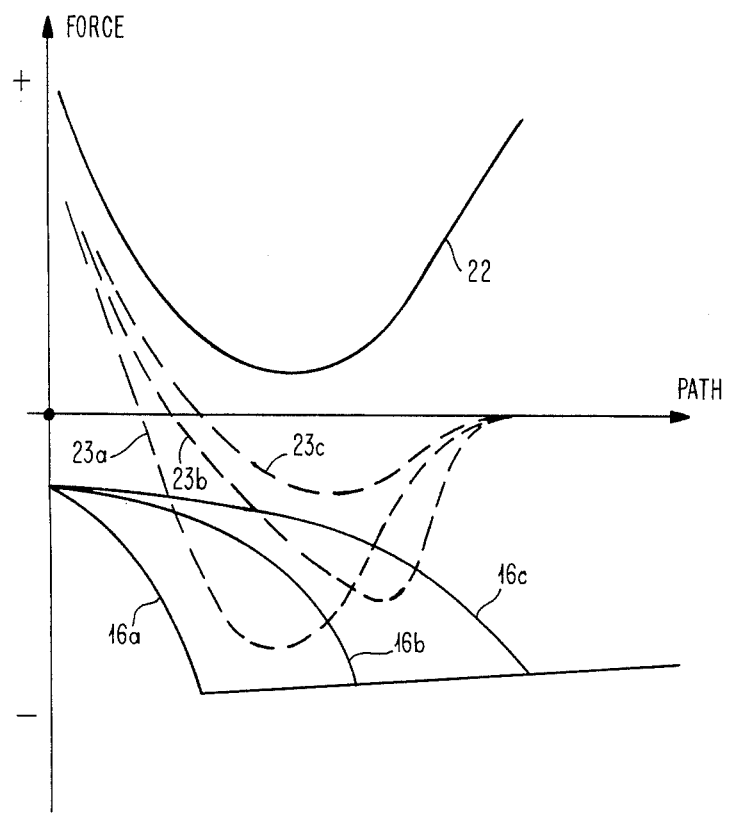
Figure 8:
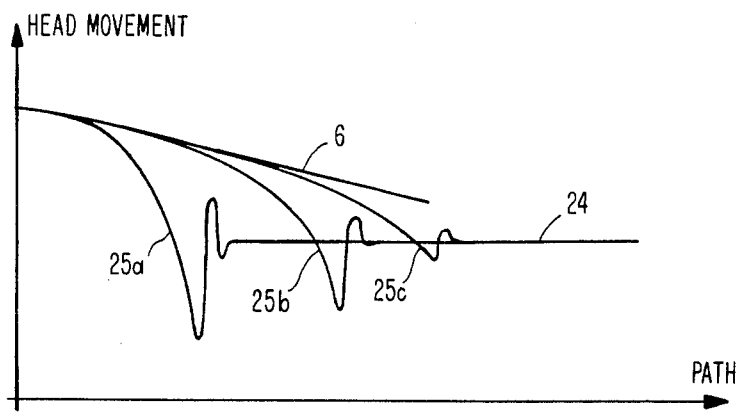

One way of carrying out the invention will be described in detail below with reference to drawings which illustrate only one specific embodiment, in which FIG. 1 illustrates purely schematically the new apparatus with the print head being lifted off, FIG. 2 illustrates purely schematically the new apparatus with the print head being lowered onto the record carrier, FIG. 3 is a detail schematic of the compensating unit in the inoperative state and FIG. 4 in the operative state, FIGS. 5 to 8 are diagrams explaining the dynamic conditions during the substantially bounce-free landing of a print head, and in which, in particular, FIG. 5 shows the forces acting on the print head in the previously proposed system, FIG. 6 shows the forces acting on the ramp in the apparatus according to the invention, FIG. 7 shows the resultant forces under the influence of different response curves of the release magnet, and FIG. 8 shows the movement of the print head from the time it touches the ramp to the time it reaches the print plane.

FIG. 1 shows a printhead 1 positioned at the left end of the platen 4 where the printhead is being held to provide a spaced relation between print electrodes 2 and record carrier 3. While described in connection with an electroerosion printer, the new apparatus may, of course, also be used for any print head whose lowering motion onto the record carrier is to be effected bounce-free. The platen 4 has a resilient surface. The print head 1 is moved left to right along the print line by a carriage (not shown)., A tiltable lever 5 having a sliding face or ramp 6 constituting an inclined plane is positioned at the left-most end of platen 4 in the region of left-most carriage movement. This lever 5 can be tilted about a rocker 7.

The forces moving the print head toward the ramp and the record carrier are marked by an arrow 8 in a vertical, and an arrow 9 in a horizontal direction. Force 8 is derived, for example, from a suitably biased spring whereas force 9 is derived from the movement of the print head in the print direction.

After actuation of the release magnet, the print head initially moves downward in a vertical direction until it touches ramp 6. The side face of the print head has attached to it a sliding shoe 10, sliding along the ramp 6, constituting an inclined plane. The position of the sliding shoe is such that with lever 5 being in its lowest position, print electrodes 2 rest with a slight pressure against record carrier 3.

The excess kinetic energy occurring when the print head is lowered onto the ramp is made ineffective with the aid of the lever 5.

As may be seen from FIG. 3, lever 5 is provided with a lever arm 11. In addition, there is an angular support 12 which is fixed to the platen support. A resilient or flexible element 13 is positioned between lever arm 11 and support 12. This flexible element 13 preferably has a progressive non-linearly increasing characteristic. In the inoperative state, the print head is positioned above lever 5. When the print head is lowered, sliding shoe 10 touches ramp 6 of lever 5 for the first time. At that stage, lever 5 is still positioned on its support, serving as a stop for its rest position. During a lowering motion of the print head in the direction of the arrows 8 and 9, the lever 5 is tilted, while the flexible element 13 is compressed. This system has, in fact, the desired properties, meaning that the print head reaches the ramp and subsequently its print position bounce-free. Thus, during the lower process, oscillations are prevented since the spring and mass of the lever may be determined to be such that their oscillation time exceeds the time required for lowering the print head to its print position. The critical impact to which the ramp is subjected during the lowering of the print head is converted in the lever into an angular momentum and damped, so that the print head soft-lands on the ramp.

In the system disclosed in the aforesaid application Ser. No. 496,760, there are different forces whose interaction had to be considered for the present further development in order to reach optimum results. These dynamically acting forces will be considered only qualitatively so that the inventive principle may be readily appreciated.

The characteristic 14 of the restoring spring (force as a function of deflection) is shown in the rest position in FIG. 5. For initiating the downward motion of the print head, the magnet (not shown) releasing the locked spring assembly is actuated. The spring tension causing the print head to be pressed against the platen is designated as 15. The curve of the force acting on the armature of the release magnet is schematically illustrated and designated as 16. It will be readily apparent that this force increases rapidly as the air gap decreases. The resultant spring tension is designated as 17 and the total resultant as 18. If the print head, during its downward motion, is lowered onto a ramp, the conditions shown in FIG. 6 are obtained, provided that the damping element 13 and a resilient platen are used. The curve of the force acting on the tilting lever is designated as 19. This force decreases non-linearly as a function of the deflection. The non-linear progressively increasing force resulting from the damping element 13 is designated as 20, the force resulting from the platen as 21 and the force resulting therefrom and acting on the ramp 6 as 22.

FIG. 7 shows the influence of different response characteristics of the release magnet on the resultant force. Three different response characteristics 16a, 16b and 16c lead to three increasingly smoother resultants 23a, 23b and 23c. The influence of these forces on the movement of the head as it is lowered onto the ramp 6 until it reaches the print plane 24 is shown in the curves 25a, 25b and 25c of FIG. 8. This means in other words that, given a suitable selected magnetic field of the release magnet, a soft and smooth closing of the magnetic circuit is achieved only if there is a small air gap and the print head with its sliding shoe 10 moves along the ramp 6, constituting an inclined plane. With the new design, the air gap of the magnetic circuit of the release magnet for the print head is closed slowly with the aid of the inlined plane ramp of lever 5. In addition, there is an accurately defined time at which the slow lowering motion of the print head becomes faster until the head reaches the print plane 25.

If the print head is positioned in the tiltable part of lever 5, then the time up to the start of the faster lowering motion is defined by the lever geometry, the spring tension of the print head and the spring bias of the flexible element. Similarly, the lowering path and the lower lever are determined by the lever geometry, the spring tension at which the print head is pressed against the record carrier, and by the spring constant of the flexible element. Thus, this apparatus for the bounce-free lowering of a print head onto a record carrier is independent of the distance between print head and record carrier. During operation, this apparatus for the bounce-free lowering of a print head depends only on the geometry of the lever and the forces acting on the two lever ends and thus is independent of any vertical movement of the platen or print platen determining the position of the record carrier.

The invention permits a highly accurate and bounce-free lowering of the print head onto a record carrier at a well-defined pressure.

We claim:

1. Apparatus for controlling the landing of a printhead on a record carrier supported by a platen as the printhead moves laterally with respect to the record carrier comprising, in combination,
    a landing ramp overlying a portion of said record carrier and defining a guide surface that is inclined toward said record carrier along the direction of lateral printhead movement, said ramp being pivotally supported for movement toward and away from said record carrier,
    a guide shoe connected to said printhead for engaging the guide surface during printhead landing, and
    an elastically deformable element for yieldably urging said ramp in the direction away from said record carrier against the force of said printhead landing thereon.

2. Apparatus according to claim 1, characterized in that the elastically deformable element has an increasing force/deformation characteristic.

3. Apparatus according to claim 2, characterized in that the elastically deformable element has an increasing non-linear force/deformation characteristic.

4. Apparatus according to claim 1, characterized in that the platen has a resilient surface.

* * * * *